(12) United States Patent
Narayanaswami

(10) Patent No.: US 6,720,860 B1
(45) Date of Patent: Apr. 13, 2004

(54) PASSWORD PROTECTION USING SPATIAL AND TEMPORAL VARIATION IN A HIGH-RESOLUTION TOUCH SENSITIVE DISPLAY

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 09/608,110

(22) Filed: Jun. 30, 2000

(51) Int. Cl.[7] .......................... G05B 19/00; G06F 7/00; G08C 19/00
(52) U.S. Cl. .................... 340/5.54; 340/5.74; 340/5.55; 340/5.85; 713/202; 345/741
(58) Field of Search ............................... 340/5.54, 5.74, 340/5.55, 5.85, 7.55; 368/13, 10; 713/202, 200, 176; 708/109, 111; 380/205, 54

(56) References Cited

U.S. PATENT DOCUMENTS

| | | | |
|---|---|---|---|
| 3,885,408 A | * 5/1975 | Clark, Jr. | ...................... 70/278 |
| 4,786,900 A | * 11/1988 | Karasawa et al. | ..... 340/825.31 |
| 4,815,032 A | * 3/1989 | Fujii | .......................... 364/900 |
| 5,428,349 A | * 6/1995 | Baker | ...................... 340/825.3 |
| 6,209,104 B1 | * 3/2001 | Jalili | .......................... 713/202 |
| 6,459,890 B1 | * 10/2002 | Kim | .......................... 455/351 |

OTHER PUBLICATIONS

"The World's Smallest PDA Computer Watch", Hammacher Schlemmer Mid Summer 2000 Catalog, p. 3.

* cited by examiner

Primary Examiner—Michael Horabik
Assistant Examiner—Vernal Brown
(74) Attorney, Agent, or Firm—Scully, Scott, Murphy & Presser; Gail H. Zarick, Esq.

(57) ABSTRACT

A wearable mobile computing device/appliance (e.g., a wrist watch) with a high resolution display that is capable of wirelessly accessing information from the network and a variety of other devices. The Wrist Watch device/appliance includes a password authentication system for enabling access to secured data stored therein. The authentication system includes a user interface display having a touch sensitive panel for detecting physical user interaction therewith and generating signals accordingly. The Wrist Watch device/appliance generates a sequence of one or more images for display via the user interface, the images of a sequence including that users' password elements which are flashed randomly at different interface display locations and varied temporally. A processor device receives signals generated in accordance with user interaction with the touch sensitive panel at locations corresponding to the locations of a flashed image of the sequence that matches each element of the user password in order to provide verification of the password when all elements of the password have been detected.

27 Claims, 6 Drawing Sheets

PASSWORD PROTECTION USING SPATIAL AND TEMPORAL VARIATION IN A HIGH-RESOLUTION TOUCH SENSITIVE DISPLAY

BACKGROUND OF THE INVENTION

1. Field of the Invention

This invention relates generally to mobile computing devices such as personal digital assistants (PDAs), cellular phones, pagers, and the like, and more specifically, to a wearable device/appliance (e.g., a wrist watch) capable of wirelessly accessing information and equipped with an interactive user interface incorporating novel password protection mechanism for protecting data and preventing unauthorized access to data and applications.

2. Discussion of the Prior Art

Computing, mobile and wireless communications technologies have been rapidly advancing—culminating in a variety of powerful user friendly devices such as personal digital assistants (PDAs), cellular phones, pagers, etc. Today, it is possible to purchase handheld PDA's, e.g., palmtops such as the Palm Pilot®, that employ wireless communication devices and that combines computing, telephone/fax, and networking features. A typical PDA may function as a cellular phone, fax sender, and personal organizer and are pen-based, requiring a stylus for text entry. As such, these device incorporate handwriting recognition features and may even employ voice recognition technologies that react to voice input. Small devices such as the RIM 950 and the Motorola PageWriter 2000 pager use a small keyboard for input.

Today, the industry is striving to provide advancements by providing increased PC desktop-like functionality while both decreasing size and power requirements. More recently there have been attempts to incorporate some of the capabilities of the above devices into wrist watches. However, today, only special wearable watch devices are available that, besides time keeping functions, may possess a compass, or a Global Positioning System (GPS), or barometer, heart rate monitor, Personal Handy System (PHS) phone, pager, etc. There are shortcomings in these existing special function watches in that most of them are bulky, are mostly unconnected to the Internet or other PC/network devices, have limited battery life, and, are difficult to use. These currently available special function wrist watches additionally have user interfaces that are quite limited in what they can display. For example, in the context of setting time in digital watches, currently, the user is only enabled to set the hour and minute independently, with time only advancing in one direction. Furthermore, most of them have a 6 to 8 seven segment LED or LCDs which can be used to display 6 or 8 digits/letters, and have a small number of indicators that can display AM/PM, Alarm on/off, etc. only at fixed locations within the display. A few watches are currently appearing on the market that have slightly richer display characteristics. Regardless, these various shortcomings have to be solved, otherwise there is no compelling reason for these watches to become popular. The design of a wrist watch for mobile computing applications offers a significant challenge because the watch is a small device. That is, both fitting components and power supplies such as batteries into such a small volume and given the limited screen size of watches pose limitations that have be overcome. Solving these issues is worthy because the watch is an attractive form as 1) it is one of the few devices that a very large fraction of the population is already accustomed to worldwide, 2) is accessible almost all the time, and, 3) is hard to lose.

It would thus be highly desirable to provide a wearable device/appliance (hereinafter "wrist watch") capable of wirelessly accessing information and equipped with an interactive user interface and high resolution display for providing a variety of desktop PC-like functions.

Via the user interface, it would be highly desirable to provide a password protection mechanism that prevents unauthorized access to sensitive data that is stored in the wearable device/appliance. Typical password protection mechanisms, e.g., such as implemented in Automatic Teller Machines (ATMs), building, room and car door entry systems, and the like, are typically fixed keypad entry systems, and not entirely fool proof as a possible intruder may still observe a user's finger movement and potentially ascertain the user's password. U.S. Pat. No. 5,428,349 describes a password entry system that provides a matrix of characters/numbers that are random ordered. A user presses a dedicated row or column button for each character of the memorized password appearing in that row/column. That is, the matrix pseudo randomly changes in each password character iteration, making the possibility of password theft and system intrusion difficult.

It would be highly desirable to provide a wearable device/appliance (a wrist watch) implementing a password protection mechanism that prevents unauthorized access to sensitive data that is stored therein that randomly changes the image sequence spatially and temporally, making it nearly impossible for a perpetrator who is watching a user's fingerpresses to intrude the system.

It would be additionally be highly desirable to provide a wearable device/appliance (a wrist watch) implementing a password protection mechanism that may be implemented for control or access of a device located proximately to the user, e.g., an ATM machine, and that is equipped to communicate with the wrist watch device via a wireless communications protocol.

SUMMARY OF THE INVENTION

It is an object of the present invention to provide a wearable device/appliance (a wrist watch) capable of wirelessly accessing information and equipped with an interactive user interface and high resolution display for providing a variety of desktop PC-like functions.

It is another object of the present invention to provide a wearable device/appliance (a wrist watch) implementing a password protection mechanism for preventing unauthorized access to sensitive data stored therein and that randomly changes the image sequence spatially and temporally, making it nearly impossible for a perpetrator who is watching a user's fingerpresses to intrude the system.

It is a further object to provide a wearable device/appliance (a wrist watch) implementing a password protection mechanism that may be implemented for control or access of a system or device located proximately to the user, e.g., an ATM machine, and that is equipped to communicate with the wrist watch device via a wireless communications protocol.

According to the invention, there is provided a password authentication system for a wearable Wrist Watch device/appliance that enables access to secured data stored therein. The authentication system includes a user interface display having a touch sensitive panel for detecting physical user interaction therewith and generating signals accordingly. The Wrist Watch device/appliance generates a sequence of one or more images for display via the user interface, the images of a sequence including that users' password elements which may be flashed variably with respect to time and at different interface display locations and spaced-apart temporally. A processor device receives the signals generated in accordance with user interaction with the touch sensitive panel at locations corresponding to the locations of a flashed image of the sequence that matches each element of the user password in order to provide verification of the password when all elements of the password have been detected.

The spatial and temporal variation of the user's password elements in the displayed sequence of images makes it nearly impossible for a perpetrator who is watching a user's fingerpresses to intrude the system. Furthermore, the principles of the invention as disclosed herein may be applied to any password entry system such as implemented in ATMs, buildings, rooms, and home and car door entries, etc.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
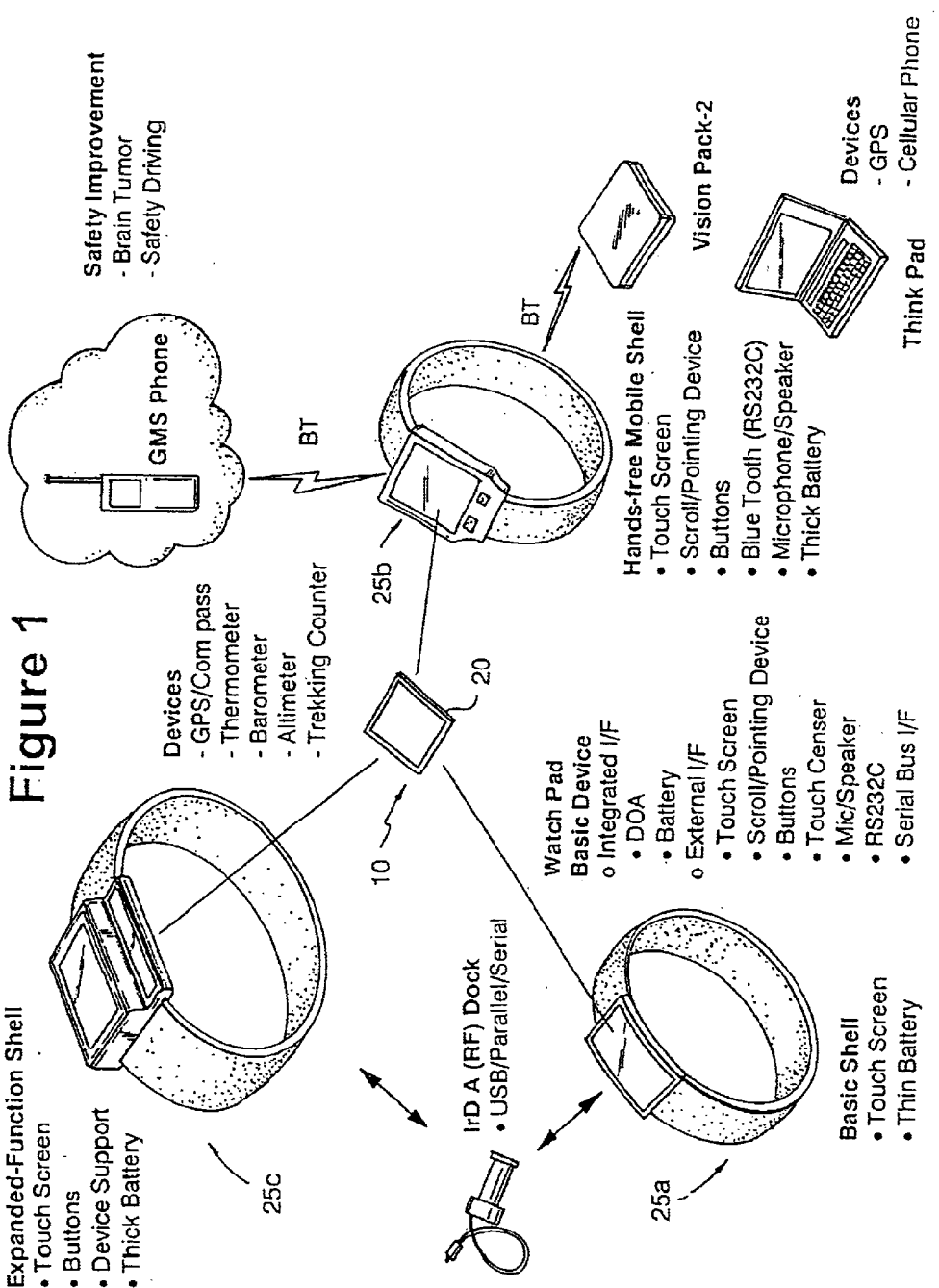
FIG. 1 illustrates conceptually the wearable information access wrist watch device of the invention.

FIG. 1 illustrates conceptually the wearable information access wrist watch device of the invention. Referred to herein as the "Wrist Watch" 10, the system looks like a regular watch but is capable of receiving information from adjunct devices such as a PC, a mobile computer, other pervasive devices being carried by the user and directly from a network via a wireless communications mechanism.

As shown in FIG. 1, the Wrist watch system 10 is based on a modular concept designed to include a motherboard or base card 20 of minimum card size that leverages state-of-the-art technologies as will be described in greater detail herein. Specifically, the base card 20 may be implemented in various types of shells 25a, . . . , 25c for enabling various functions. For example, the base card 20 may be implemented in a basic shell 25a providing desk-top like functionality via a touch screen display; a hands-free mobile shell 25b providing, in addition to basic desktop functionality, a communications interface with GPS and mobile phone communications capability etc., and including a touch screen display, scroll/pointing devices, and microphone and speaker devices; and an expanded function shell 25c, providing touch screen, buttons and support for various devices such as GPS/compass, thermometer, barometer, altimeter, etc.

Figure 2:
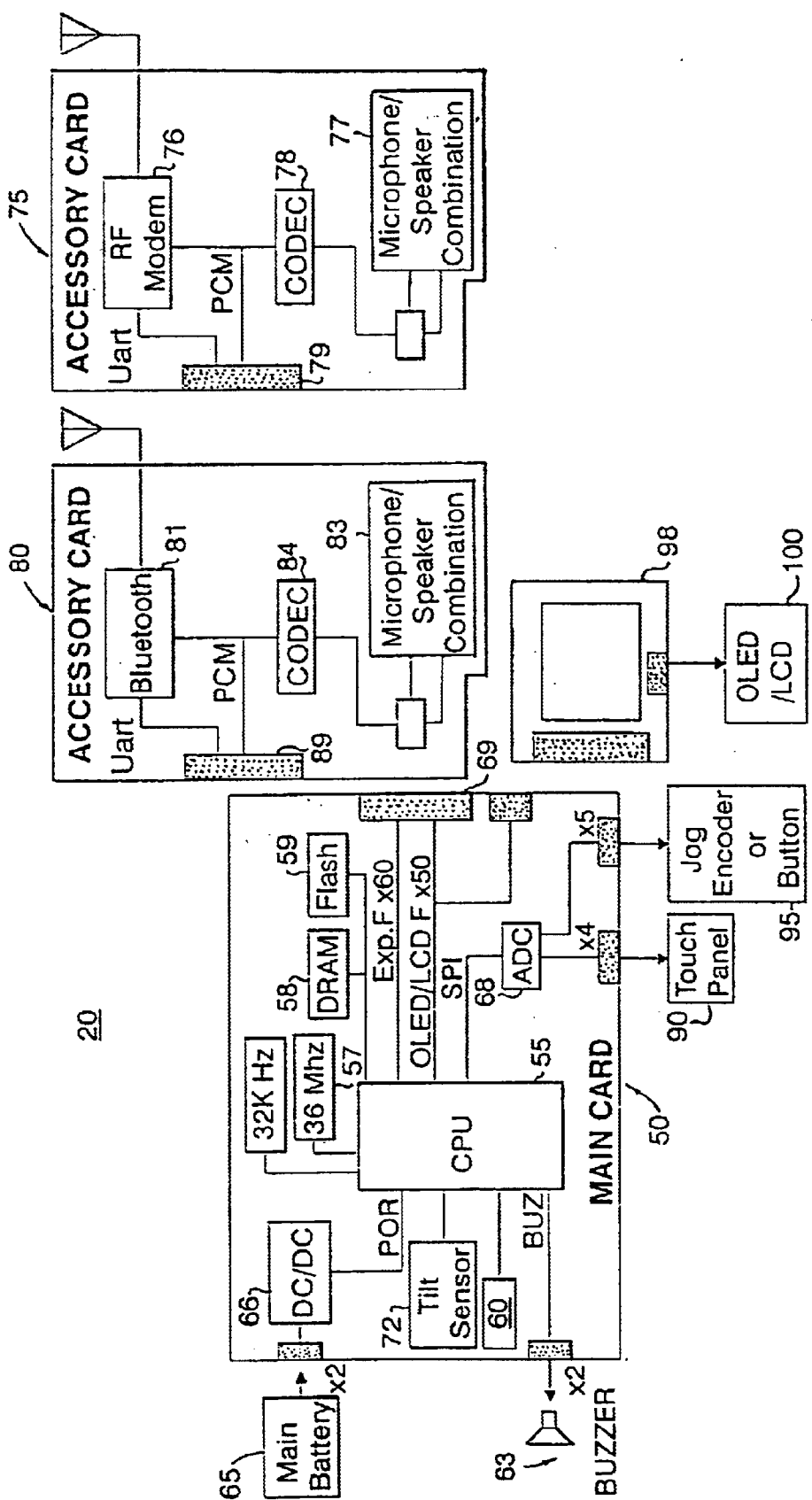
FIG. 2 is a detailed block diagram illustrating the hardware architecture of the wrist watch appliance 10 implementing the dynamic scroll device of the present invention.

FIG. 2 is a detailed block diagram illustrating the hardware architecture of the Wrist Watch system 10. As shown in FIG. 2, the base card 20 includes a first or main card 50 housing the core processing unit, I/O, and memory. For example the main card 50 includes a CPU 55, such as a Cirrus Logic CL-EP7211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem of the Wrist Watch 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Wrist Watch 10. Other interfaces such as Universal Serial Bus (USB), and I2C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Wrist Watch system/sub-system load.

With further reference to FIG. 2, the main card 50 has no audio capability but is equipped with a PCM audio interface in expansion tabs (not shown) for an accessory card, i.e., either card 75 or 80, in the expanded-shell Wrist Watch designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc. As shown in FIG. 2, each speaker/microphone combination 77, 83 is connected to a respective pulse-coded modulation PCM coder/encoder devices (CODECs) 78, 84 which are controlled by a respective PCM interface 79,89 to the CPU 55. The accessory card 75, 80 is additionally equipped with various communications subsystems including low power and intermediary power radio frequency communications devices that support a Wireless Application Protocol ("WAP") used to provide communications links to mobile computers, mobile phones, portable handheld devices and, connectivity to the Internet In one embodiment, the specific communications subsystems include circuitry for supporting BlueTooth 81 or like small-factor, low-cost radio solution circuitry, e.g., an RF-modem 76, and may include other low power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Wrist Watch system 10 is provided with a touch sensitive screen/panel 90 shaped within a standard watch form factor, and also a roller wheel mechanism, i.e., jog encoder 95. The touch sensitive screen enables the direct launching of applications by physical user entry of a graffiti "squiggle" in the manner such as described in commonly-owned co-pending U.S. patent application Ser. No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Wrist Watch display areas. In one embodiment, the touch sensitive screen panel is provided with a four (4) position touch screen. For instance, forward and back navigation for Wrist Watch displays is enabled by physically touching certain areas of the touch sensitive panel. The roller wheel mechanism 95 may be rolled up or down (i.e., clockwise or anticlockwise) to simulate a display cursor scrolling function for text and graphics. For example, in the context of the present invention, the roller wheel mechanism 95 generates signals that are A/D converted for receipt by the processor to enable movement of the Wrist Watch display cursor, and more particularly, movement of displayed minute hand and hour hand indicators for setting of various alarms and time-keeping functions provided by the Wrist Watch system. Preferably, when the wheel mechanism moves by more than a predetermined amount, e.g., 20° degrees, the wheel generates a signal as a mouse device would when rolled. If a user rolls the wheel continuously, the wheel generates a signal for every 20 degrees of rotation (hereinafter "rotation event(s)"), with the event generated including an indication specifying whether the wheel was turned clockwise or and clockwise. In this manner, the direction of the roller wheel, and consequently, the direction of cursor movement through a particular display, is tracked by the processor. The roller wheel mechanism additionally may be pushed or depressed to generate a signal (hereinafter "wheel click event(s)"), akin to a keypress or mouse click event, for activating a selected application, hyperlink or a menu item. In an alternate embodiment, the roller device may comprise a bezel which may be rotated and depressed for generating rotation and wheel click events respectively, such as described in commonly-owned co-pending U.S. patent application Ser. No. 09/607,594 entitled BEZEL BASED USER INTERFACE FOR A SMART WATCH, the whole contents and disclosure of which is incorporated by reference as if fully set forth herein. It is understood that other types of scroll device may be implemented to provide cursor movement, e.g., a slider. Moreover, a standard button may be implemented for providing selection functions.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the watch, a mechanical four-way tilt sensor 72 is further provided comprising mechanical switches (for detecting degree of tilt) producing signals which may be detected by the CPU. This sensor may be used for the various purposes such as power management, display control, etc. In a preferred embodiment, additional sensors may be attached to the Wrist Watch device over an interface. Examples may include additional tilt and motion (velocity, direction, speed) sensors, environment sensors such as thermal sensors, pressure sensors, health monitoring sensors such as blood pressure, etc. The Wrist Watch accordingly provides the display for the sensor and may also analyze the data collected from the sensors.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items on the watch face, similar to what may be displayed on a computer screen or a Palm Pilot®. For example, the time may be represented by drawing the hour and minute hands on a watchface display. Further, the hands of the watchface display may be erased when, at some other time, a display of a photograph is desired to be displayed.

Figure 3:
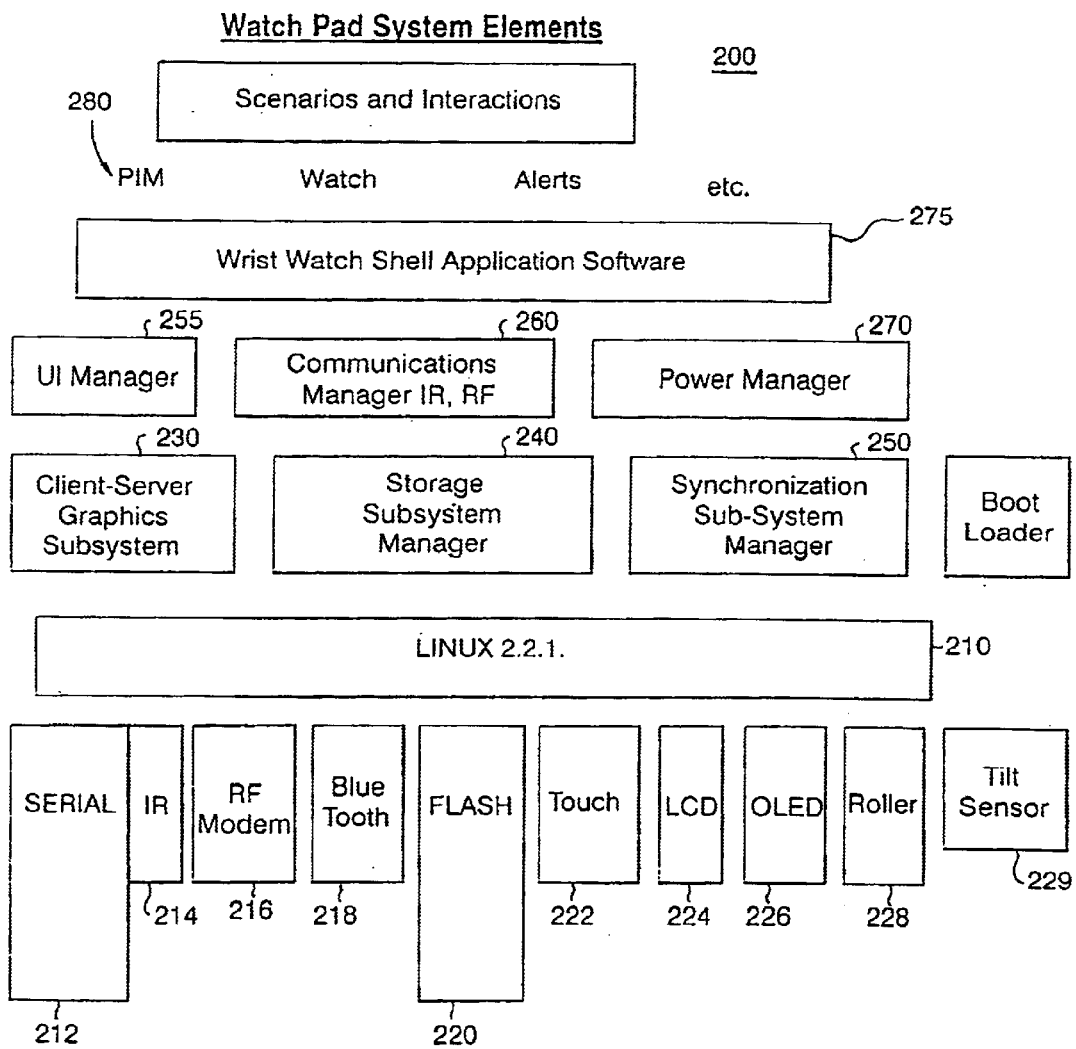
FIG. 3 illustrates the software architecture 200 for the Wrist watch device 10.

FIG. 3 illustrates the software architecture 200 for the Wrist Watch device 10. At its lowest level, the Wrist Watch system runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver 226, roller wheel subsystem driver 228 and tilt sensor device driver 229. A 240 and synchronization sub-system manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the roller wheel (jog encoder) and touch panel for the appropriate applications. A communication subsystem manager 260 is provided to handle events from communication channels and pass the events to the right application to set things up for data transfers to proceed. The synchronization manager 250 is provided to synchronize data between the Wrist Watch and the other devices. Particularly, it receives the data from the communication channel and operates in conjunction with the right application to decode the sent data and update the data for the application receiving the data. An example of this would be an update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

Figure 4:
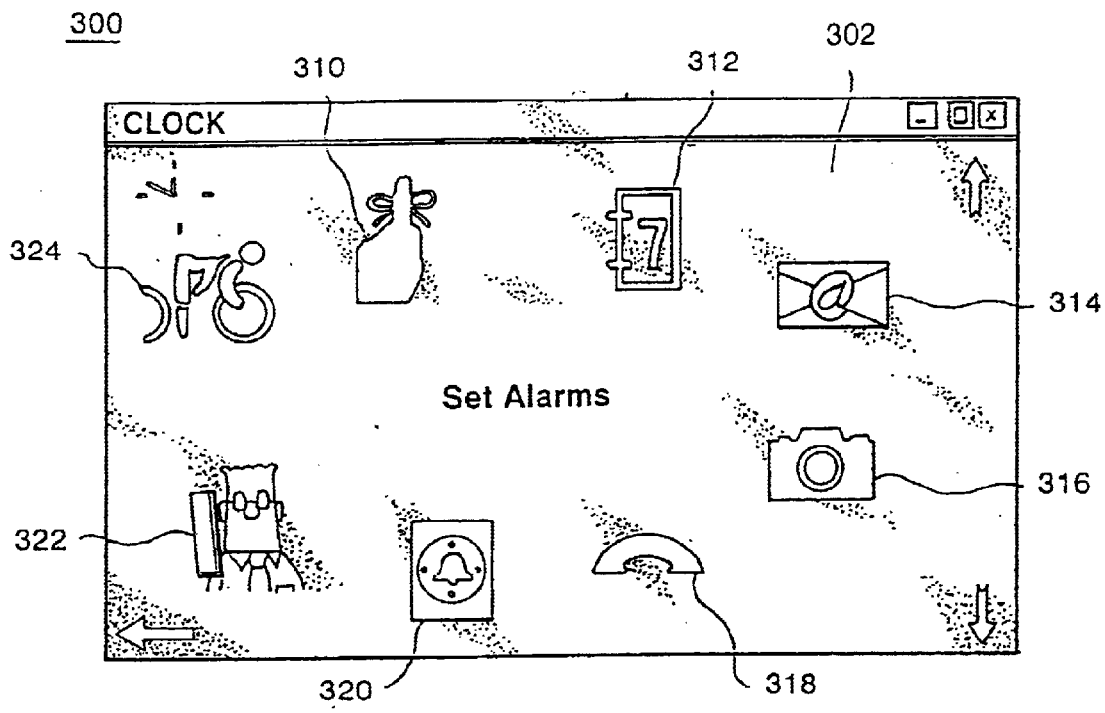
FIGS. 4 and 5 illustrate example OLED system displays 300 and 350 providing respective menu ring of selectable icons for launching Personal Information Management applications provided in the Wrist Watch device.
Figure 5:
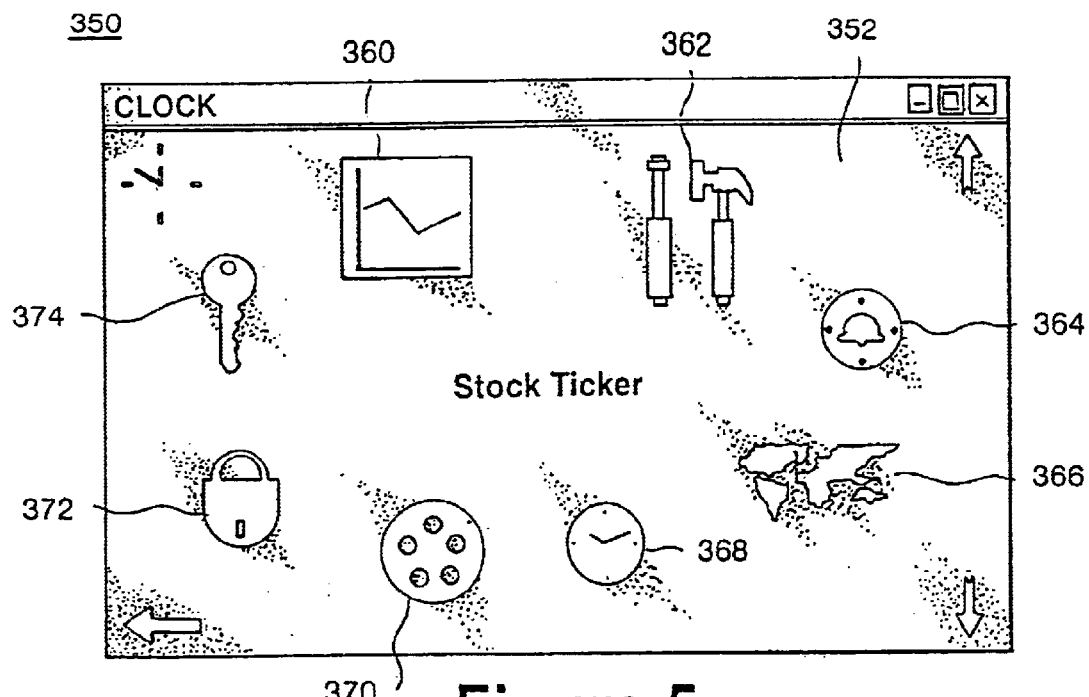

As further shown in FIG. 3, the Wrist Watch device 10 is equipped with Wrist Watch shell application software 275 provided on top of the basic graphics, communication and synchronization subsystems. One key application supported is the microbrowser which enables access to a WAP-supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms, e.g., buttons. Details regarding the implementation of WML in the Wrist Watch device may be found in commonly-owned, co-pending U.S. patent application Ser. No. 09/608,042 entitled SYSTEM AND METHOD EMPLOYING WML ANNOTATIONS FOR USER INTERFACE CONTROL OF A WEARABLE APPLIANCE the contents and disclosure of which is incorporated by reference as if fully set forth herein. Other supported applications include Personal Information Management (PIM) applications software 280. FIG. 4 illustrates an example system display 300 providing a main menu 302 comprising selectable icons for launching the following PIM applications: an icon 310 for launching an application directed to displaying/maintaining "to do" lists, an icon 312 for launching an application directed to displaying/maintaining calendars and appointments, an icon 314 for launching an application directed to retrieving/storing/displaying e-mail messages, an icon 316 for launching an application directed to retrieving/storing/displaying digital photographs and bit-mapped images, an icon 318 for launching an application directed to retrieving/storing/displaying phone lists, an icon 320 for launching an application directed to setting of time and alarms which is shown highlighted and indicated by the displayed text "SET ALARMS", an icon 322 for launching an application directed to retrieving/storing/displaying comic images such as Dilbert© United Feature Syndicate, Inc., and, an icon 324 for launching an application directed to providing stop watch and elapsed time features. Other applications may include those enabling the receipt of excerpts of personalized data, such as traffic information, weather reports, school closings, stock reports, sports scores, etc., from the world wide web. These excerpts may be received as notifications or alarms on the Wrist Watch system 10. Inter-device interaction software applications are included to permit the watch display to become the display for another device such as a GPS located in a concealed location, (e.g., a bag), or a thermostat on the wall, etc. Thus, this application software enables communication between the other device and the Wrist Watch by receiving/displaying the data and transmitting back information sent from the Wrist Watch. As a further example, caller Id information may be displayed on the Wrist Watch display when the cell phone that belongs to that person rings. Typically, multiple persons are congregated in a room and carry their cell phones in a hand bag or wear them on their belts, have a hard time determining which cell phone is ringing when a ringing tone is heard in a room. This results in every person in the room pulling out his/her cell phone out of their handbag or belt to check if it is the one that is ringing. The caller Id display feature of the Wrist Watch device is particularly advantageous as each wearer may simply glance at the watch and would immediately know if the ringing phone belonged to him/her, in addition, to determining who the calling party is facilitating the decision of whether or not he/she should answer the phone. In a further example, this application software may allow the data from the Wrist Watch storage subsystem 240 to be viewed on another device such as on a PDA, PC, and other community viewing devices. In the preferred embodiment, middleware such as Tcl/Tk, Javascript, Perl, or the like etc., may run on top of the operating system, graphics and communication manager APIs for facilitating rapid development of these applications on the Wrist Watch device 10.

Figure 6A:
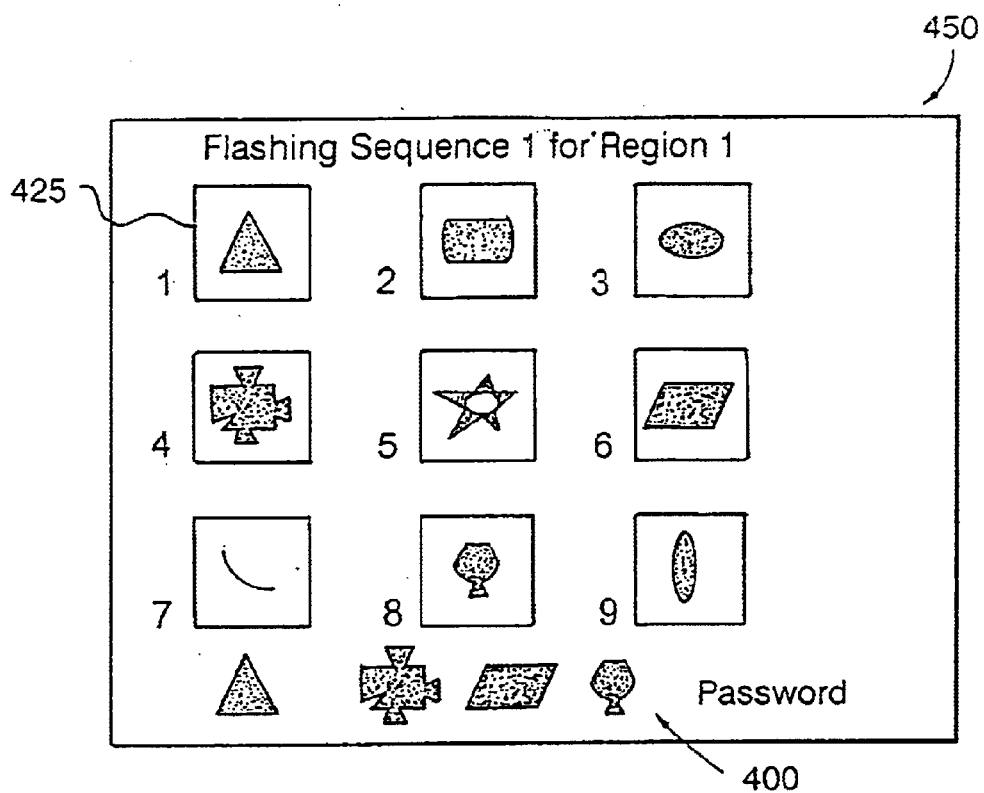
FIG. 6(a) illustrates a sequence of a first example password authentication display presented in a region of the Wrist Watch display.

The present invention is directed to a password protection mechanism for preventing unauthorized access to sensitive data stored in the Wrist Watch device via the high resolution touch-sensitive display that implements randomly changing image sequences spatially and temporally. In the preferred embodiment, the user first pre-selects the choices comprising his/her password or may download his/her choice. The password may comprise any number of characters, e.g., numbers or letters, or may comprise images such as geometric shapes, animals, people or combinations thereof. An example password sequence 400 comprise four geometric shapes is illustrated in FIG. 6(a).

When a user desires to access an application, for instance, a PIM application for storing passwords or locations of user keys, the Wrist Watch device will first display a screen prompting user authentication. In the preferred embodiment, for each element of the user password, images are flashed, one at a time, in sequence, in a region of the screen. To validate oneself, the user touches, e.g., taps, the touch-sensitive display panel portion at the screen location when the correct password element (image) is flashed on that portion of the screen. This means that the user has to wait for the right image to be displayed in accordance with his/her password. It is understood that each flashed image of a sequence may appear on the screen for a different period of time, randomly determined. Further, it is understood that the length of the image sequence may be varied depending on the security needs of the user and the time between image flashes may be randomized. Once a user password element for a sequence has been identified, the flashing sequence of images corresponding to the next and succeeding user password elements, may move to a next portion of the display interface corresponding to another touch screen region.

For example, in one embodiment, the Wrist Watch display device possesses an accuracy of four distinct touch-sensitive regions. In a first touch-sensitive region of the display 450, such as the example password authentication display depicted in FIG. 6(a), the following nine (9) images may be presented in the following enumerated sequence: triangle (1), rounded rectangle (2), horizontal ellipse (3), camcorder (4), star (5), parallelogram (6), arc (7), face (8), and vertical ellipse (9). It is understood that these images may equally comprise a sequence of animal images such as a cow, pig, horse, elephant, rhino, duck, and fish or, comprise pictures of people. In this example, given the user's password comprising the geometric shapes 400 including the triangle, cam corder, parallelogram and face, the user will tap the touch-sensitive screen in the first region 450 of the display at the location of the triangle 425 at the time the triangle is flashed and before the picture changes. If the user had set the first choice as the parallelogram for the first region, then the user would have to wait until the parallelogram is displayed in the region and then tap the first region of the display before the picture changes. As described, the touch screen mechanism generates signals in response to user touching of the panel at the location of the touch sensitive panel, which are A/D converted for receipt by the processor. The processor in return, processes the signals by comparing them with the user's password sequence for verification of the right touch sequence.

Figure 6B:
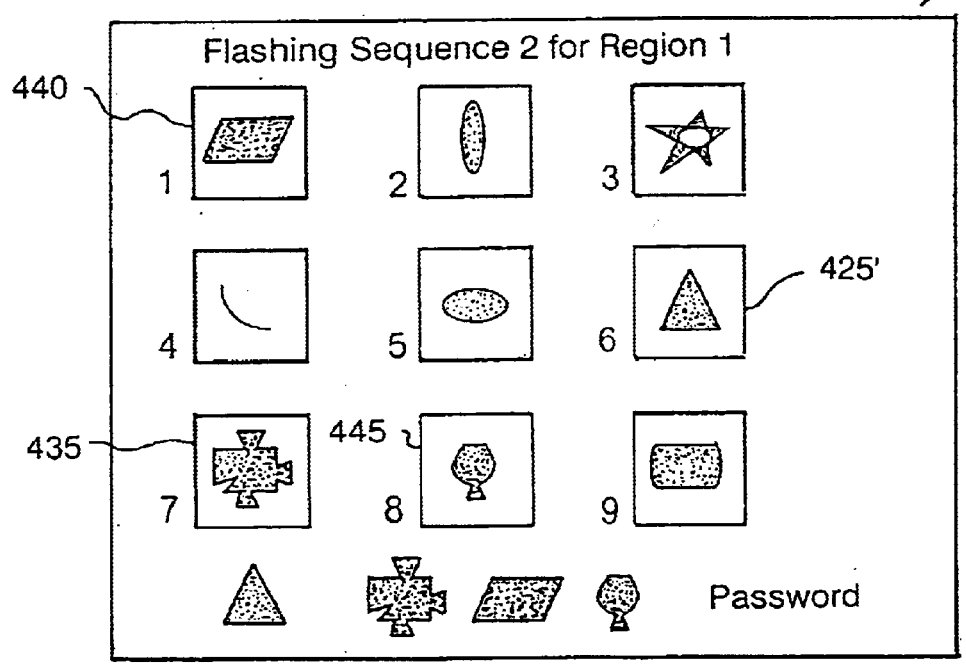
FIG. 6(b) illustrates a sequence of a second example password authentication display presented in the region of the Wrist Watch display.
Figure 6C:
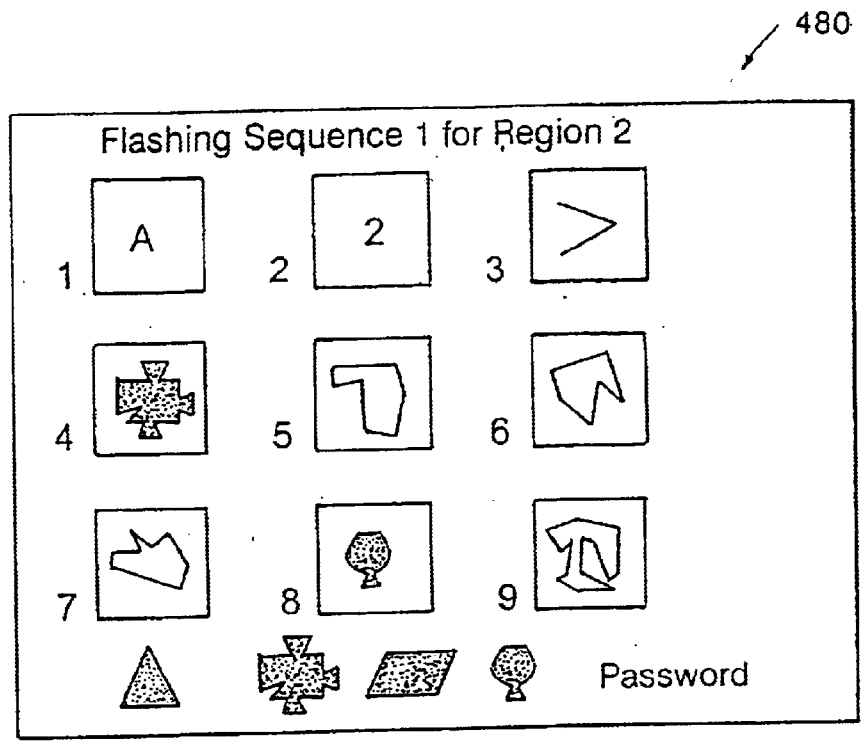
FIGS. 6(c) and 6(d) illustrates respect third and fourth varied image sequences of example password authentication displays presented in another region of the Wrist Watch display.
Figure 6D:
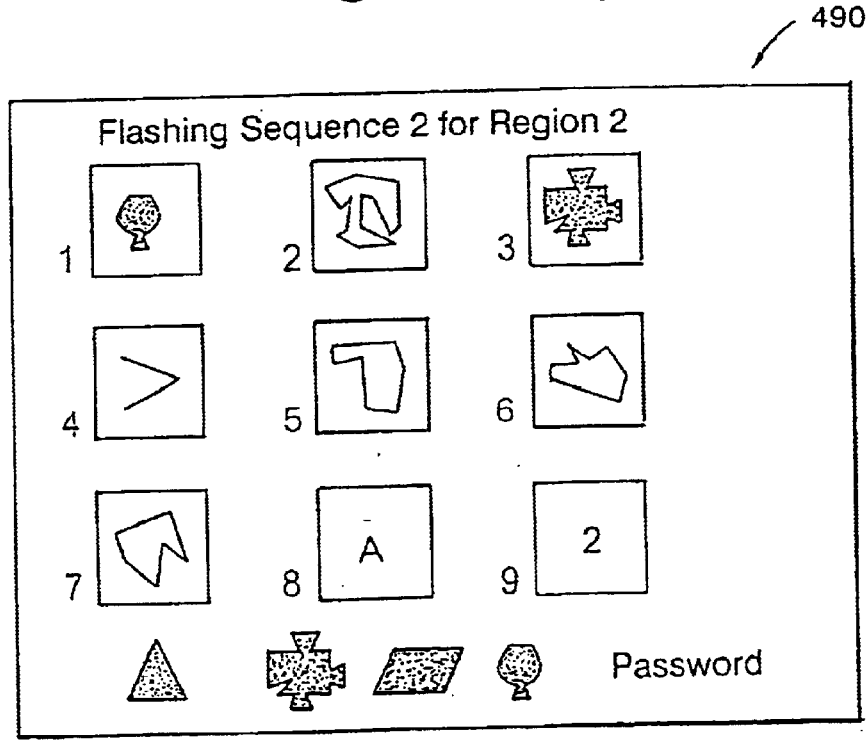

FIG. 6(b) illustrates a second example sequence 475 comprising nine (9) images, displayed as a second sequence in the first region of the display, e.g., corresponding to the second user password element. This second sequence prompts the user to press the touch-sensitive screen when the icon corresponding to the second element of the user's password, e.g., camcorder 435 image, is displayed. It is understood that, a next flashing sequence of images 480, 490 may be displayed in a second region of the display, as illustrated in FIGS. 6(c) and 6(d), respectively, and subsequently, in the third and fourth regions of the display (not shown). In fact, each of the flashing image sequences may be distributed randomly, in each of the four touch-sensitive panel regions of the device display in order to provide further complexity. For example, a display of images appearing in each of regions 1–4, adds further complexity so that a potential perpetrator observing the user would have to observe extremely closely in order to be able to correlate all the actions the user takes. It is understood however, that the number of regions to use on the screen is not critical and one may use just one region if desired. The regions just introduce a variation in the place where the user has to tap the screen.

It is further understood that, the image sequence displayed at a first region may be different from the image sequence displayed for another region. That is, for each region, the sequence of images maybe varied randomly, e.g., by a standard random generator, and the sequence is changed over time so that each time the user enters his password, the probability of the right graphic appearing on any of the nine possible positions in the sequence is evenly distributed. For example, after the user provides a first tap of the screen after a first element of his password is detected, the system may immediately display a different sequence order, so that the second tap will be different. Thus, for the example of a four element password of FIG. 6(a), after the first element is hit in the FIG. 6(a), then the mapping may immediately change such as shown in FIG. 6(b). This type of randomization may occur either in the beginning of the whole sequence or it could randomly keep changing at any point in time.

The process of flashing icons in the region is repeated until the user is authenticated by tapping of the touch screen panel of the user interface at the times when each corresponding icon element of the user password is flashed. Longer passwords can be entered by requiring the user to provide a second round of entries, for example, by returning back to the first region after finishing the entry in the fourth region. Moreover, the time for which a single image is flashed on the screen may additionally be varied from sequence to sequence.

In the above scenarios, if the user misses the opportunity to press an icon, e.g., the parallelogram, the sequence will be repeated so that the user may try to catch it in the next iteration. After a predefined number of iterations, e.g., five (5), the system will lock the user out and an alternative means of resetting the login program is invoked in order to reset the system. This may include some unique encrypted code that is wirelessly broadcast to the watch. The Wrist Watch device will then receive the encrypted code and decode it and reset the login program so that the user may attempt to log in again. In order for the code to be sent over the wireless channel, the user will have to call a service, authenticate himself by providing something like a social security number or unique id.

As mentioned, besides enabling password entry in different regions of the interface display screen, the time factor may be built in to provide a further password protect element. The concept here is that only one image of the sequence is flashed on the display screen at a time, e.g., first the triangle, then the rounded rectangle, etc., as shown in FIG. 6(a). When the correct image of the user's password sequence is displayed, then the user will touch the touch screen interface. If the image of the user's password sequence is not displayed, then the user will wait. The system will repeatedly flash each succeeding image of the sequence in uniform or randomly timed fashion via the interface until the correct image of the sequence is displayed. Thus, if a potential perpetrator is observing the user, that perpetrator has to note not only what image the user is tapping, but when the user is tapping it, thus adding a further element of randomization.

Thus, for the example sequence displayed in FIG. 6(a), given the example password 400, the user will press on the first image (triangle) then wait and press on the fourth image (camcorder) then wait and press on the sixth image (parallelogram) and then the eighth image (face) which is essentially an evenly spaced flashing time sequence. It is understood that the time difference between successive image displays is programmable and may range from tens of milliseconds to several hundreds of milliseconds. The example image display sequence of FIG. 6(b) is more exaggerated in time as the user will first have to wait until the sixth image is displayed (triangle 425') (for the user password sequence 400) and then immediately press the next (seventh) image displayed (camcorder 435). In this example embodiment, assuming the displayed sequence repeats, the user would then have to wait to bypass image displays 8 and 9 until the first image of the sequence is again displayed which corresponds to the third element of the password (parallelogram 440) and then would have to wait again until the eighth image is again displayed which corresponds to the fourth image of the password (face 445). This example illustrates how the display introduces a further time randomization element.

It is understood that according to another aspect of the present invention, the Wrist Watch device password protection system may be implemented to enable user access to their ATM accounts or access to building or car door entries that are able to communicate with the Wrist Watch device, e.g., via RF modem or Bluetooth communications technologies. Thus, for example, a user may enter a four digit personal identification number (PIN) at an ATM machine via the Wrist Watch user interface in the manner described herein and, subsequently communicate the PIN to a receiving device associated with the desired system to be accessed to enable verification and entry thereof.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for enabling access to data stored in a wearable appliance and including a user interface display having a touch sensitive panel for detecting physical user interaction therewith, said user having an associated password comprising a sequence of one or more elements, said method comprising the steps of:
    a) generating a sequence of one or more flashing images for display via said user interface, said flashing image sequence including users' password elements with flashed images of said sequence spatially arranged in the display and presented variably with respect to time;
    b) detecting a user interaction with said touch sensitive panel at a location of said flashed image provided on said display in response to a match of a flashed image of said sequence with a password element in order to provide verification of said password; and,
    c) repeating steps a) and b) until all elements of said password have been detected.

2. The method as claimed in claim 1, wherein said generating step a) further includes the step of displaying said one or more images in sequence in a predetermined region of said display, said user interaction with said touch sensitive panel being at a location of said image presented on said display.

3. The method as claimed in claim 1, wherein said user interface is partitioned into predefined touch sensitive regions, said generating step a) further including the step of randomly changing the location of said displayed sequence in said one or more predetermined regions.

4. The method as claimed in claim 1, wherein said generating step a) further includes the step of varying the amount of time between the display of successive images in said sequence.

5. The method as claimed in claim 1, wherein said generating step a) further includes the step of varying the duration of time for which an image of said sequence is displayed.

6. The method as claimed in claim 1, wherein said generating step a) further includes the step of randomly varying the order of the displayed images of said sequence.

7. The method as claimed in claim 6, wherein said step of randomly varying the order of the displayed images is in response to a first user interaction with said touch sensitive panel.

8. The method as claimed in claim 1, further including varying the length of said image sequence in accordance with the user's security needs.

9. The method as claimed in claim 1, wherein said touch sensitive panel generates signals in accordance with user interaction therewith, said method further including the step of communicating generated signals from said wearable appliance in accordance with a user password to a remote device and providing access to said remote device upon verification of said user password.

10. A system for enabling user access to data stored in a wearable appliance, said user having an associated password comprising a sequence of one or more elements, said system comprising:
    a) a user interface display having a touch sensitive panel for detecting physical user interaction therewith and generating signals in accordance therewith;
    b) device for generating a sequence of one or more flashing images for display via said user interface, said flashing image sequence including users' password elements with flashed images of said sequence spatially arranged in the display and presented variably with respect to time;
    c) processor mechanism located in said appliance for receiving generated signals in accordance with user interaction with said touch sensitive panel at locations corresponding to the locations of a flashed image of said sequence that matches each element of said user password in order to provide verification of said password when all elements of said password have been detected.

11. The system as claimed in claim 10, wherein said generating device further includes mechanism for displaying said one or more images in sequence in a predetermined region of said display, said user interaction with said touch sensitive panel being at a location of said image presented on said display.

12. The system as claimed in claim 10, wherein said user interface is partitioned into predefined touch sensitive regions, said generating device further including mechanism for randomly changing the location of said displayed sequence in said one or more predetermined regions.

13. The system as claimed in claim 10, wherein said generating device further includes a mechanism for varying the amount of time between the display of successive images in said sequence.

14. The system as claimed in claim 10, wherein said generating device further includes a mechanism for varying the duration of time for which an image of said sequence is displayed.

15. The system as claimed in claim 10, wherein said generating device further includes mechanism for randomly varying the order of the displayed images of said sequence.

16. The system as claimed in claim 15, wherein said mechanism for randomly varying the order of the displayed images is responsive to a first user interaction with said touch sensitive panel.

17. The system as claimed in claim 10, wherein said generating device further includes mechanism for varying the length of said image sequence in accordance with the user's security needs.

18. The system as claimed in claim 10, further comprising a communication device for enabling wireless communication with a remote system, wherein upon verification of said user password, generated signals from said wearable appliance are communicated in accordance with a user's password to a remote device for providing access to said remote device.

19. A program storage device readable by a machine, tangibly embodying a program of instructions executable by the machine to perform method steps for enabling access to data stored in a wearable appliance and including a user interface display having a touch sensitive panel for detecting physical user interaction therewith, said user having an associated password comprising a sequence of one or more elements, said method steps including the steps of:
    a) generating a sequence of one or more flashing images for display via said user interface, said flashing image sequence including users' password elements with flashed images of said sequence spatially arranged in the display and presented variably with respect to time;
    b) detecting a user interaction with said touch sensitive panel at a location of said flashed image provided on said display in response to a match of a flashed image of said sequence with a password element in order to provide verification of said password; and, c) repeating steps a) and b) until all elements of said password have been detected.

20. The program storage device readable by a machine as claimed in claim 19, wherein said generating step a) further includes the step of displaying said one or more images in sequence in a predetermined region of said display, said user interaction with said touch sensitive panel being at a location of said image presented on said display.

21. The program storage device readable by a machine as claimed in claim 19, wherein said user interface is partitioned into predefined touch sensitive regions, said generating step a) further including the step of randomly changing the location of said displayed sequence in said one or more predetermined regions.

22. The program storage device readable by a machine as claimed in claim 19, wherein said generating step a) further includes the step of varying the amount of time between the display of successive images in said sequence.

23. The program storage device readable by a machine as claimed in claim 19, wherein said generating step a) further includes the step of varying the duration of time for which an image of said sequence is displayed.

24. The program storage device readable by a machine as claimed in claim 19, wherein said generating step a) further includes the step of randomly varying the order of the displayed images of said sequence.

25. The program storage device readable by a machine as claimed in claim 24, wherein said step of randomly varying the order of the displayed images is in response to a first user interaction with said touch sensitive panel.

26. The program storage device readable by a machine as claimed in claim 19, further including varying the length of said image sequence in accordance with the user's security needs.

27. The program storage device readable by a machine as claimed in claim 19, wherein said touch sensitive panel generates signals in accordance with user interaction therewith, said method further including the step of communicating generated signals from said wearable appliance in accordance with a user password to a remote device and providing access to said remote device upon verification of said user password.

* * * * *